United States Patent
Redol et al.

(10) Patent No.: US 8,578,407 B1
(45) Date of Patent: Nov. 5, 2013

(54) REAL TIME AUTOMATED UNOBTRUSIVE ANCILLIARY INFORMATION INSERTION INTO A VIDEO

(76) Inventors: Joao Redol, Lisbon (PT); Mauro Fernandes Lopes Lemos, S Domingos de Rana (PT); Rui Manuel de Jesus Vaz Luis, Porto Salvo (PT)

(*) Notice: Subject to any disclaimer, the term of this patent is extended or adjusted under 35 U.S.C. 154(b) by 0 days.

(21) Appl. No.: 13/545,198

(22) Filed: Jul. 10, 2012

(51) Int. Cl.
*H04N 7/10* (2006.01)
*H04N 7/025* (2006.01)

(52) U.S. Cl.
USPC .......... 725/32; 725/33; 725/34; 725/35; 725/36

(58) Field of Classification Search
USPC .......................................... 725/32
See application file for complete search history.

(56) References Cited

U.S. PATENT DOCUMENTS

| | | | |
|---|---|---|---|
| 8,009,965 B2 * | 8/2011 | Takao | 386/249 |
| 2007/0162927 A1 * | 7/2007 | Ramaswamy et al. | 725/36 |
| 2007/0204223 A1 * | 8/2007 | Bartels et al. | 715/540 |
| 2009/0079871 A1 * | 3/2009 | Hua et al. | 348/584 |
| 2010/0312608 A1 | 12/2010 | Shan et al. | |
| 2011/0075992 A1 | 3/2011 | Mei et al. | |
| 2011/0264700 A1 | 10/2011 | Mei et al. | |
| 2011/0296457 A1 * | 12/2011 | Hamilton | 725/34 |

* cited by examiner

*Primary Examiner* — Justin Shepard
(74) *Attorney, Agent, or Firm* — Selwyn S. Berg

(57) ABSTRACT

A computerized process for REAL TIME AUTOMATED UNOBTRUSIVE ANCILLIARY INFORMATION INSERTION INTO A VIDEO is described that requires no manual operations by the Source advertising business entity. A USER who has access to any computer hardware device chooses his Selected Video but sees on his Monitor that Selected Video with an Advertising Segment or a User clickable Logo inserted at some position in the video that does not distract from the dynamic content.

3 Claims, 4 Drawing Sheets

50 Monitor presentation of Selected Video and Advertising Segment in a split screen presentation and automated insertion of a Logo into the Selected Video.

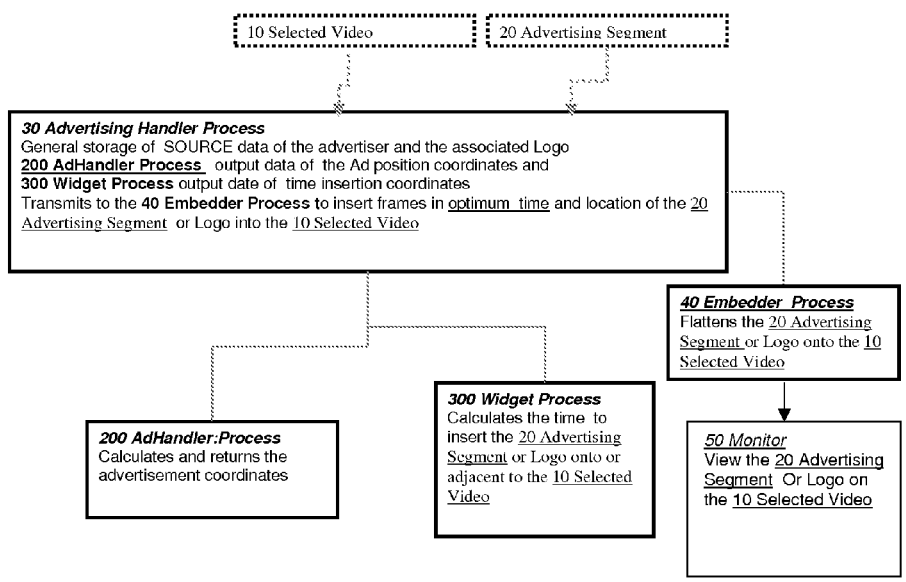
Figure 1, The overall Processes for the REAL TIME AUTOMATED UNOBTRUSIVE ANCILLIARY INFORMATION INSERTION INTO A VIDEO algorithm.

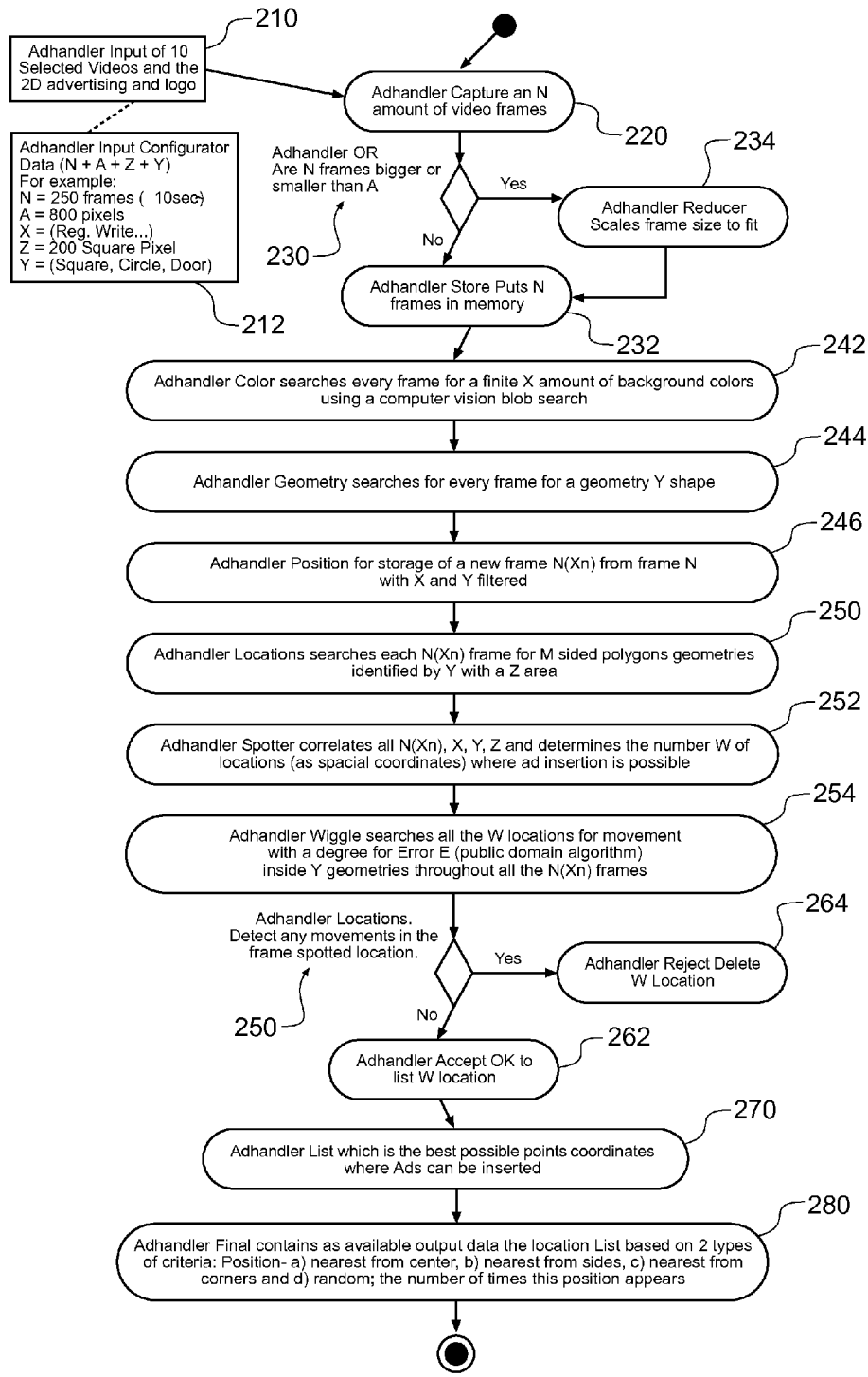
Figure 2: 200 Adhandler Process-
The subroutine of the Process to select the optimum adverting location in the selected video

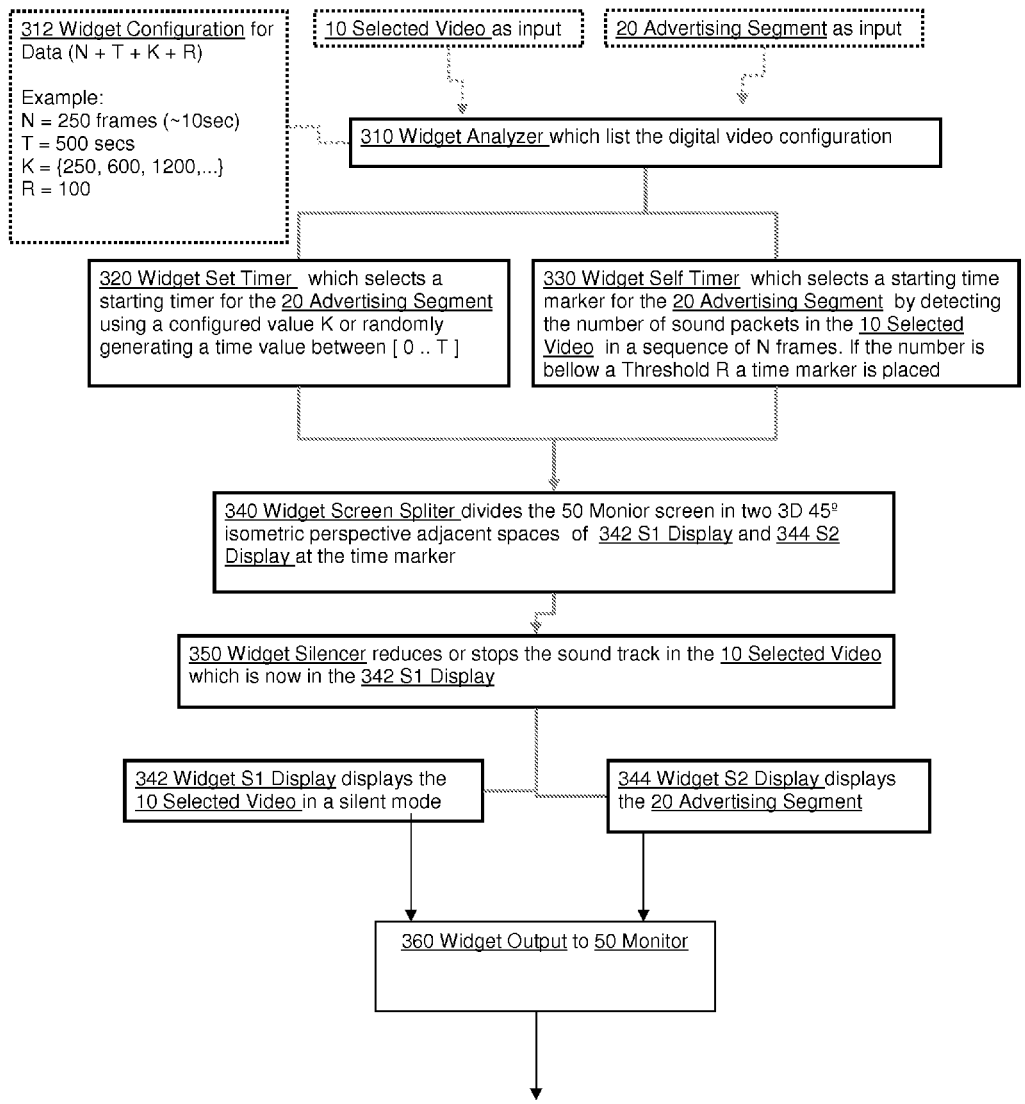
Figure 3. The Widget Process for inserting the 20Advertising Segment into the 10 Selected Video by a screen splitting subroutine.

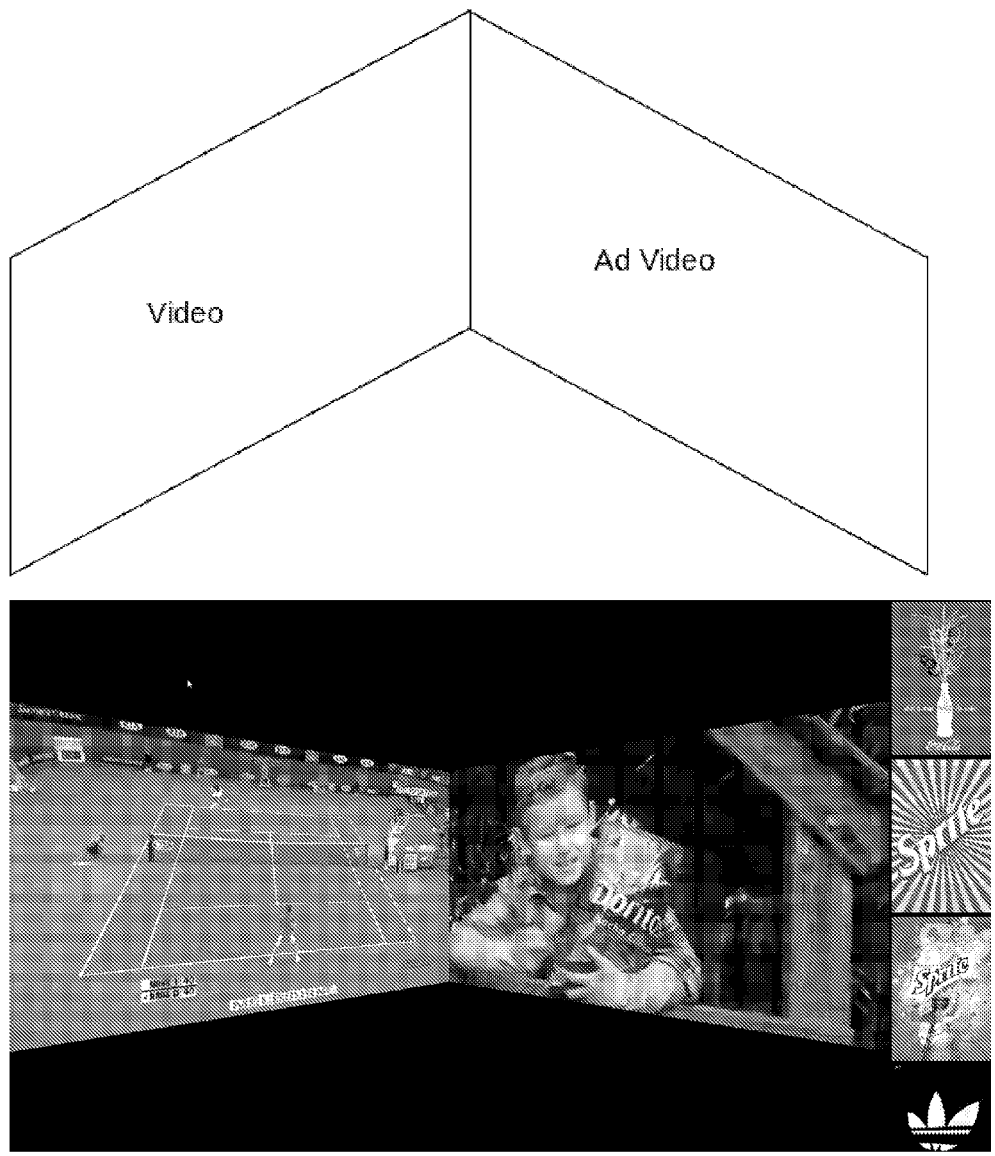
Figure 4 of the 50 Monitor presentation of Selected Video and Advertising Segment in a split screen presentation and automated insertion of a Logo into the Selected Video.

REAL TIME AUTOMATED UNOBTRUSIVE ANCILLIARY INFORMATION INSERTION INTO A VIDEO

REFERENCES CITED

Published Applications

US 2011/0075992A1 Mei et al. Mar. 31, 2011 INTELLIGENT OVERLAY FOR VIDEO PROCESSING
US2011/0264700 A1 Mei et al. Oct. 27, 2011 ENRICHING ONLINE VIDEOS BY CONTENT DETECTION, SEARCHING, AND INFORMATION AGGREGATION
US2010/0312608 A1 Shan et al. Dec. 9, 2010 CONTENT ADVERTISEMENTS FOR VIDEO
US2009/0079871 A1 Hua et al. Mar. 26, 2009 ADVERTISMENT INSERTION POINTS DETECTION FOR ONLINE VIDEO ADVERTISING

BACKGROUND OF THE INVENTION

1). Proposed Field Classification.

The field of invention is primarily in CLASS 345, Computer graphics processing and selective visual display systems and involves CLASS 348, Television and CLASS 707, Data processing: database and file management or data structures. The potential subclasses are too numerous to mention as data processing covers many sub-disciplines.

2). Introductory Information And Related Art

Advertising is a main sources of revenue for internet companies (Sources) operating communication channels on the ubiquitous Internet. Some companies have their operation based solely on advertising income. With the constantly growing number of communication devices (e.g.: Smart TV set, a mobile device, a laptop, a PC or a tablet.), the target audience is accessible over many of these communication channels. The Internet is the central communication provider of the Sources using these various communication channels and advertising is the main way the Sources make a profit. Targeting potential customers (Users) connected with their mobile communication devices to the Internet has made inserted digital media advertising a major avenue to get public exposure. However, the usual approach of using pop-ups has been so distracting and annoying to Users, all communication devices have internal programs to block them. Therefore, new methods to target the public has to be used to get to these Users. These Users can be accessed 24 hours a day on many different communication devices all connected at one information communication channel.

Goggle™ is well known communication channel which sells Internet advertising. In pursuit of a broader audience of Users, Goggle™ bought Utube™ and explored inserting advertising into movie digital media, but had limited success. Being able to insert advertising digital media into movie digital media will open a new technique to sell products to Users. For example, take an old classic movie like THE WIZARD OF OZ which has an ongoing youth audience and inserting into that movie a promotion for children's red shoes by some advertiser company (Advertiser) but without distracting the audience from the art of the movie itself

A) PRIOR ART

The rapidly growing area of digital video presentations has produced a crowded art of somewhat ambiguous innovations. Of the many published applications and the few granted patents, it is noted that US 2011/0075992A1 of Mar. 31, 2011 for a INTELLIGENT OVERLAY FOR VIDEO PROCESSING by Mei et al. also notes the importance of "Once the most relevant video advertisement and the least intrusive overlay area have been designated for the selected video shot, the designated video advertisement is scheduled for overlaying onto the designated overlay area". However, as claimed it is apparently that the final decision requires human intervention. US2011/0264700 A1 of October also by Mei et al. appears to be a shotgun description of character identification but also implies manual implementation for presentation.

US2010/0312608 A1 of December, 2010 by Shan et al. for CONTENT ADVERTISEMENTS FOR VIDEO does introduce a method for analyzing a video content for the insertion of a claimed text media advertisement. However, the within method inserts a video of an Advertising Segment at an appropriate time and space—which is considerable more effective than just a text format. By contrast, Hua et al. in US2009/0079871 A1 suggests a method for ADVERTISMENT INSERTION POINTS DETECTION FOR ONLINE VIDEO ADVERTISING whereby it recognizes the greater impact of video over plain text in an automated insertion process. However, the method of Hua is directed at seeking out the most effective advertisement location as a top priority rather than a non-obtrusive placement.

In general, over 100 published documents have been reviewed as well as an extensive survey of the market, and no functioning system was found which accomplishes the goals as effectively as the within Specification which is currently operating successfully in the applicants laboratory.

INVENTION SUMMARY

An objective of the within invention is in implementing an efficient architecture with a non obtrusive algorithm of embedding advertisements into a User selected digital video content. The advertisement can be an Advertising Segment which may be either a playlet promoting the product or brief advertising text (as would be found on a poster sign) or—in the alternative-a Logo which has secondary meaning associated with the product. Such advertising should blend non-intrusively with the inherent video digital media content (the Selected Video) so as not to obfuscate the true video experience while maximizing revenue for Advertisers and Sources. The flattened presentation appears on the User's Monitor which may be any kind of device that has a operating system and display such as mobile phones, tablets as well as computers.

The within algorithm invention (REAL TIME AUTOMATED UNOBTRUSIVE ANCILLIARY INFORMATION INSERTION INTO A VIDEO) embodies the method and algorithm which allows a User connected to a communication channel to watch video digital media (Selected Video) with embedded non-obtrusive advertising digital media (Advertising Segment or Logo), both in real-time events or transcribed events. The process routines to accomplish the objective in this invention are well established but subject to various descriptive idioms used in computer programming. However, these subroutines are synergistic in that they produce a novel result that is greater than the known constituent parts. In this description of the invention, the User of some software application (firmware) which is installed on his digital device merely downloads from the Internet the desired Selected Video media and with that selected video digital media also obtains promotional Advertising Segment material from some Advertiser as if that Advertising Segment or Logo were part of the original content of said selected video digital media.

This invention can be applied to any software application such as IPTV, VoD and video streaming with any encoding (e.g. avi, mp4), on any digital communication channel and using any type of receiving communication device.

The program is user friendly in that the User either has the application firmware for acquiring video digital media or he installs the necessary program/firmware. That firmware has the REAL TIME AUTOMATED UNOBTRUSIVE ANCILLIARY INFORMATION INSERTION INTO A VIDEO program associated and the User may be required to enter the usual sequence of registering by password. The User may then choose from a list of available content video digital media for his Selected Video. The User will have the usual buttons to control sound quality and screen presentation. However, when the advertisement shows up in the User's selected video digital media, he will be able to manually click on a button or the Logo to display or store the Advertising Segment pertaining to the business of the Advertiser. This is a routine procedure known and used by all who use any of the available communication devices.

Overall Basic Description of the Invention Processes

The invention components primarily comprises (A) network solution architecture of the overall algorithm for the REAL TIME AUTOMATED UNOBTRUSIVE ANCILLIARY INFORMATION INSERTION INTO A VIDEO, (B) Adhandler Process insertion method for digital video content advertisement insertion and (C) Widget Process and Embedder Process presentation method for viewing simultaneously the selected video digital media content with inserted advertising digital media. Each of these programming steps is briefly described as follows—

A). Network solution architecture illustrated in FIG. 1.

The architecture for the overall algorithm has 4 Processes of
- 30 Advertising Handler Process
- 40 Embedder Process
- 200 AdHandler:Process
- 300 Widget Process as well as the primary input of the 10 Selected Video and 20 Advertising Segment and the necessary output 50 Monitor (which is any device which includes all the usual User hardware & software found in all retailed computers). These Processes contain subroutines which contain the following necessary information I. a global advertisement provider (SOURCE) which stores all meta-data about
  a) the advertisement, the producer of the product (ADVERTISER)
  b) the target user (USER) (e.g.; name, age, location, gender,),
  c) the USER profile (e.g. what the user prefers).
  and a internal program which stores the correlations between all this data.

This information is all stored in the listings associated with the Advertising Segment.

II. A global content provider (SOURCE) which, stores all digital medial content (the original movie digital media of the 10 Selected Video and the inserted advertising digital media of the 20Advertising Segment by its encoded identification). It is from this SOURCE that the user obtains his Selected Video.

III. A distributed software algorithm that connects to both providers, correlates information and the REAL TIME AUTOMATED UNOBTRUSIVE ANCILLIARY INFORMATION INSERTION INTO A VIDEO algorithm for showing the video content to the user with the advertisements seamlessly embedded in the digital video content.

The advertisement content showed to the user is automatically and intelligently determined by public domain correlation software as to be that which promotion is most relevant to the target user.

B). Insertion Method of the 200 AdHandler:Process for digital video content advertisement location detection and insertion The insertion method is accomplished by decomposing the video digital media content into a series of consecutive frames and then finding/identifying an advertisement place/location which will receive a layer containing the correlated advertising digital media for this USER. Additionally and most importance:

the insertion method works on real time without any type of off-line preprocessing;
the insertion method works automatically;
the insertion method intelligently finds/identifies the best non-intrusive spatial-temporal advertisement location.
The insertion method does not require any kind of manual intervention.

Detailed Insertion Method Description:

The Insertion Method is programmed to finding appropriate areas for the advertising media that does not disturb action/movement of the User selected movie digital media by selecting digital trains of static coding which maintains its same background color so a layer image of advertising digital media will blend non-obtrusively. This system analyzes the video digital media content according to some matching color or framing which has an appropriate temporal frame interval to effectively display the advertising digital media. For example, the target may be a still door, a sport event background display, a piece of cloth or even a reasonably static sky.

This insertion method makes a decision by choosing from the list of such areas so identified which is either one or several of them on a priority of area dimensions, static time and the location in the frames of the USER selected video digital media. If there is not a selection by priority decision, the insertion point can be a random choice.

Finally, this insertion method employing its said decision, inserts the composed advertising 20 Advertising Segment digital media layer which is flattened by the 40 Embedder Process onto the top of the 10 Selected Video video digital media content. The composition assures a fit in time and space and compatible color and matte.

Detailed Insertion Method Steps Within The Several Processes:

The following steps explain how the contained digital data is processed.

1. Using established video programming techniques the insertion method captures a finite N amount of frames from the video digital medial content;
2. To assure proper performance if the N frames are bigger than a configured size than it reduces the frame size;
3. It stores all the N frames for analyses one by one; and then performs the analysis by
   Searching every frame for a finite X amount of background colors and geometry (doors, sky, t-shirt, wall, car, floor, pitch, etc. . . . ) and stores a new frame N(Xn) from frame N and filtered with one of the colors from the X colors searched represented here by Xn;

For each N(Xn) frame the program searches for m sided polygons geometries identified by Y with a configurable Z area where advertisement digital media will be inserted;

Correlates all N(Xn) frames, X colors, geometries Y and area Z and determines the number W of locations for insertion of advertisement digital medial insertion;

Chooses the places which have no movement to assure a reasonable display time by searching static (or almost static with a degree error of E), Y geometries throughout all the N(Xn) frames;

For each N(Xn) analyses all Y geometries by Z area and chooses at least one optimum group from the W spots using the decision criteria, as described above, to locate and insert the advertising digital media layer according to position—nearest from center, nearest from side, nearest from corners; furthest from corners; random and;

appearance—all frames, top-n presences and most frequent.

Presentation Method for Simultaneous Viewing of Advertising Digital Medial and Video Digital Media.

The presentation method allows the viewing of the video content chosen by the user and video advertising at the same time.

Presentation Method Description:

The presentation method assures the USER can view his selected video digital media that contains the inserted advertising digital media on his communication device without disturbing the artistic content of his selection.

Detailed Presentation Method Steps of the 300 Widget Process:

The 300 Widget Process manipulates the data so as to:

1 Splits the screen in two 45° isometric perspective adjacent spaces

2. One of the perspectives pastes the original video digital media layer of the 10 Selected Video while the other pastes the advertising digital media of the 20 Advertising Segment 3. A subroutine selects the time frames to show a layering of the advertising digital media perspective onto the original video digital media layer according to the sound decision criteria and then flattens the layers.

4. The presentation method to the 50 Monitor is flattened in the 40 Embedder Process which is configured to modulate the audio track in the original 10 Selected Video video digital media so as to combine any necessary audio data associated with the 20Advertising Segment digital media.

BRIEF DESCRIPTION OF THE FIGURES

The algorithm of FIG. 1 is a literal logical statement of a functioning system composed mostly of public domain subroutines. The call-outs in the figures follow the declarative programming paradigm. Each subroutine performs specific logical tasks and is titled by Underlining That Subroutine. Those versed in the video programming art recognize the procedural programming involved which are generally in the public domain. The combination of these subroutines are defined as processes and defined in Bold Format. The several Processes of Subroutines are synergistic in that they provide a novel algorithm which permits the automated insertion of prepared media (20 Advertising Segment) into the user selected video (10 Selected Video) without obscuring the content of interest to the viewer of that selected video. Both the 10 Selected Video and 20 Advertising Segment are in some common codecs which are to be decoded and surveyed in the succeeding Processes. Each Process is defined by the particular Subroutinea associated with the Process.

FIG. 1 of the PROCESS OVERVIEW is a general description of the Processes that comprise the overall algorithm to obtain the bottom line resultant flattened combination of the input codecs of 10 Selected Video and 20 Advertising Segment to the viewer's 50 Monitor FIG. 2 of the 200 Adhandler Process shows the subroutines which analyze the input data of the 10 Selected Video and 20 Advertising Segment to obtain optimum spatial pixel coordinates to place the 20 Advertising Segment or Logo into the 10 Selected Video.

FIG. 3 of the 300 Widget Process shows the subroutines which analyze the audible data to determine an optimum time to split the 50 Monitor into a dual display of 10 Selected Video and 20 Advertising Segment. The 50 Monitor which may be any kind of device that has a operating system and display such as mobile phones, tablets as well as computers.

FIG. 4 is an illustration showing the currant 50 Monitor presentation of the 10 Selected Video and 20 Advertising Segment in a split screen presentation during a audibly quiet interval or as a selected presentation by the User and the automated insertion of a Logo into the 10 Selected Video in a frame area that does not obscure the material content of the 10 Selected Video.

DETAILED DESCRIPTION OF THE FIGURES AND THE INVENTION

In Conjunction with the above explanation of the holistic interactive functioning of the algorithm to achieve a REAL TIME AUTOMATED UNOBTRUSIVE ANCILLIARY INFORMATION INSERTION INTO A VIDEO, the following description describes the interactive functioning of the claimed invention.

FIG. 1. Process Overview

FIG. 1, titled PROCESS OVERVIEW shows the interactions between the principal PROCESSES. Shown are the inputs subroutines of the 10 Selected Video and the 20 Advertising Segment. These inputs are fed through the 30 Advertising Handler Process to the 200AdHandler Process and 300 Widget Process which determines space and time coordinates for the inputs. The frames of the input are then sent to the 40 Embedder Process which outputs those frames to the 50 Monitor of the USER.

The 30 Advertising Handler Process is quite trivial in that it is a store and switch bank to distribute bottom line information to the other processes which manipulate the data. Likewise, the 40 Embedder Process is also a public domain algorithm which flattens the video inputs into a single video display according to the prior processed data of time and space blending. In the alternative, it has the public domain screen select subroutine which responds to a select & click of the Logo to present the stored 20 Advertising Segment information to the 50 Monitor.

FIG. 2: 200 Adhandler Process

FIG. 2, titled 200 Adhandler Process the does considerable processing. The objective of the subroutines in this 200 Adhandler Process is to determine the spatial coordinates of the pixels so as to insert the Logo or the 20 Advertising Segment in the least obtrusive, but most effective, position of the 10 Selected Video.

To obtain this objective for data in the 280 Adhandler Final output, the 10 Selected Video and the 20 Advertising Segment and Logo are placed in the 210 Adhandler Input. This 210

Adhandler Input has a 212 Adhandler Input Configuration of some standard number of frames, resolution, color and the like. The 220 Adhandler Capture subroutine grabs N amount of video frames which is handed off to an "exclusive or" subroutine, 230 Adhandler Or, which are either oversized in pixels, so to go to 234 Adhandler Reducer to be reduced to some compatible size before storing in 232 Adhandler Store or they are of satisfactory size and goes directly to 232 Adhandler Store. The next subroutines find appropriate static portions of the frame pixels of the 10 Selected Video which are compatible with the 20 Advertising Segment and Logo in respect to color and size/shape.

The subroutine 242 Adhandler Color searches the frames for location of uniform color with a generic public domain vision blob search program. The next subroutine of the 244 Adhandler Geometry does a similar search for a location within the candidate color blobs listed from the output of the 244 Adhandler Color search. These new frames are output to the 246 Adhandler Position as available locations for the 20 Advertising Segment or Logo.

Since there are a number of possible locations, the 246 Adhandler Position information is input to the 250 Adhandler Locations subroutine as the output source for the optimum pixel location. The 252 Adhandler Spotter locates possible pixel coordinates and then the "exclusive or" 254 Adhandler Wiggle subroutine either passes it to the 264 Adhandler Reject or the 262 Adhandler Accept. This is the output which goes to the subroutine 270 Adhandler List. The 200 Adhandler Process has now a listing in 280 Adhandler Final which picks the candidate position for 20 Advertising Segment most effective placement of either the 20 Advertising Segment or Logo in the 10 Selected Video without any real time external manipulation 'by a programmer.

FIG. 3: The 300 Widget Process

FIG. 3 titled the 300 Widget Process determines whether to put the select & click Logo on top of the 10 Selected Video on the 50 Monitor or to split the monitor display into a dual presentation of the 10 Selected Video and 20 Advertising Segment as shown in FIG. 4. This change of video presentation will occur automatically (i.e.; without the USER left clicking the Logo). The screen splitting occurs uniquely if the 10 Selected Video has an adequate audibly quiet time interval.

The inputs to the 300 Widget Process remains the 10 Selected Video and 20 Advertising Segment which is fed into 310 Widget Analyzer which checks compatibility according to the 312 Widget Configuration. The first subroutine is 320 Widget Set Timer which places a set starting time marker for the 20 Advertising Segment which may be random value or selected T value.

Operating in parallel is the 330 Widget Self Timer. This subroutine uses the sound track of the 10 Selected Video to place a start marker by detecting the number of sound packets in the 10 Selected Video in a sequence of N frames. The subroutine 330 Widget Self Timer detects a maximum quiet level in the sound track for defining a silent level. If the number of frames of silent level is below a Threshold R number of frames a time marker is placed over tie time interval that will accommodate the 20 Advertising Segment.

The advertising company is now assured of a public presentation of its 20 Advertising Segment from either the marker from subroutine 320 Widget Set Timer or subroutine 330 Widget Self Timer. The succeeding 340 Widget Screen Splitter subroutine divides the 50 Monitor screen in two 3D 45° isometric perspective adjacent spaces of S1 and S2 at the time marker. These adjacent displays have the content of 342 S1 Display and 344 S2 Display at the time marker Since there may be some residual sound left on the 10 Selected Video in the 342 S1 Display, the 350 Widget Silencer blanks that sound to assure no distraction from the message in the 20 Advertising Segment located in the 342 S1 Display. Both the 342 Widget S1 Display containing the 10 Selected Video in a silent mode and the 344 Widget S2 Display containing the 20 Advertising Segment are then placed in the 360 Widget Output for input to the 50 Monitor as a split screen during a relatively silent part of the input 10 Selected Video for a duration that will accommodate the 20 Advertising Segment.

FIG. 4: The S1 and S2 Display on the Monitor.

FIG. 4 shows the two possible algorithm presentation on the 50 Monitor. The 4A figure shows the split screen display of the 10 Selected Video and 20 Advertising Segment which is obtained either by User selection or during an audibly quiet interim in the 10 Selected Video. The 4B figure shows the placement of a Logo on an optically static location on the 10 Selected Video. If the Logo is click selected or a control button is clicked, the 50 Monitor presentation progresses to the display of FIG. 4A.

We claim:

1. A process for a REAL TIME AUTOMATED UNOBTRUSIVE ANCILLIARY INFORMATION INSERTION INTO A VIDEO for the insertion of an Advertising Segment or Logo into a Selected Video by a User which is displayed on the User's Monitor comprising the User selecting the Selected Video from an assortment of consumer available digital videos which is transmitted into an Advertising Handler Process where it is initially stored along with the Advertising Segment and Logo where said Advertising Segment and Logo are compatible with the metadata of the User and Selected Video, and then the Advertising Handler Process simultaneously utilizes an AdHandler Process for calculating advertisement video coordinates by decomposing the video digital media content into a series of consecutive frames and then finding and identifying advertisement placement locations on said Selected Video of relatively static characteristics of color within a pixel area with geometry of adequate dimensions and an adequate time interval as a location which will receive a layer containing the Logo or the Advertising Segment as compatible with said Logo or the Advertising Segment and at said time interval and said pixel area onto the Selected Video and then choosing from the said placement locations a priority location that is likely to be most prominent on the said consecutive frames and concurrently an Widget Process for calculating a time to insert said Advertising Segment adjacent to the said Selected Video in a split screen presentation by analyzing the sound track of said Selected Video for an extended relatively quiet sequence of frames of adequate time interval that will permit the presentation of a playlet Advertising Segment and marking said quiet sequence of frames as the highest priority at the occurrence of said quiet sequence of frames then the said Advertising Handler Process conveys the processed data to an Embedder Process which flattens said Advertising Segment or said Logo onto the Selected Video and/or presents the said split screen presentation to the said Monitor whereby said Advertising Segment or said Logo is combined by the claimed processes as a integral part of the said Selected Video without distracting the User from the sequence of the selected video content.

2. Adhandler Process as described in claim 1 which comprises the subroutines of capturing N frames of the Selected Video,
- comparing the size of the N frames against a programmed standard size and
  - if the size of the N frames is less than the standard size, the N frames are passed to a color/geometry analysis,
  - if the size of the N frames exceed the standard size, the size of the N frames is reduced to less than said standard size and are passed to the color/geometry analysis, and then
- performing a color/geometry analysis by
  - searching every said frame for pixels with a static color encoding and then
  - searching for the same color pixels adjacent to each static color X to determine a geometry of said static color pixels X of a framed area Z and shape Y compatible with a given standard size and shape that would accommodate said Advertising Segment or Logo and tagging said frames as N(Xn), then passing to
- a correlation for
  - correlating all N(Xn) to determine an optimum placement of said Advertising Segment or Logo where said X, Y, Z remain dynamically static within the N(Xn) frames for a programmed time interval to assure a visibility of said Advertising Segment or Logo,
- whereby an optimum display of said Advertising Segment or Logo is positioned into said Selected Video that neither obfuscate the content of interest in the Selected Video nor is incompatible with the background.

3. A Widget Process as described in claim 1 which comprises the subroutines of
- a Widget Self Timer that performs the subroutines of
  - examining the sound track in the N frames of said Selected Video for a programmed criteria for a near zero amplitude encoding and marking this initial frame as N(s) and each succeeding frame with a time marker until the N(th) frame exceeds said near zero amplitude encoding and marking the sequence of N(s) through N(th) as the sequence N(t) and then
  - comparing said N(t) with the time length of a Advertising Segment playlet which is R, and then
    - if N(t) is less than R, a time marker T is placed at said initial frame N(s)
- and passing the entire Selected Video to a
- Widget Screen Splitter subroutine which performs the subroutine of
  - dividing the screen of the Monitor into two 3D 45° isometric perspective adjacent spaces of an S1 Display and S2 Display at the time marker T and then conveying the Selected Video to the
- Widget Silencer which performs the subroutine of
  - reducing or silencing the sound track in said o over the sequence of N(t) and then switching the Selected Video to said S1 Display for the sequence interval of N(t) and then
  - placing the Advertising Segment into the S2 Display and outputting the split video of said S1 containing the N(t) sequence of the Selected Video and said S2 containing the Advertising Segment
- whereby the screen of the Monitor is split into the dual presentation of a silent section of the Selected Video simultaneously with a sound presentation of said Advertising Segment playlet for the time interval that the original said Selected Video is relatively silent.

\* \* \* \* \*